United States Patent
Kanamarlapudi et al.

(10) Patent No.: US 11,690,123 B2
(45) Date of Patent: Jun. 27, 2023

(54) DATA INACTIVITY INDICATION AND EXPEDITED RECOVERY ACTION

(71) Applicant: QUALCOMM Incorporated, San Diego, CA (US)

(72) Inventors: Sitaramanjaneyulu Kanamarlapudi, San Diego, CA (US); Shailesh Maheshwari, San Diego, CA (US); Leena Zacharias, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 30 days.

(21) Appl. No.: 17/174,179

(22) Filed: Feb. 11, 2021

(65) Prior Publication Data
US 2021/0251033 A1    Aug. 12, 2021

Related U.S. Application Data

(60) Provisional application No. 62/975,622, filed on Feb. 12, 2020.

(51) Int. Cl.
| | |
|---|---|
| *H04W 76/19* | (2018.01) |
| *H04W 28/02* | (2009.01) |
| *H04W 74/08* | (2009.01) |
| *H04W 76/28* | (2018.01) |
| *H04W 80/02* | (2009.01) |
| *H04W 72/1263* | (2023.01) |

(52) U.S. Cl.
CPC ....... *H04W 76/19* (2018.02); *H04W 28/0268* (2013.01); *H04W 72/1263* (2013.01); *H04W 74/0833* (2013.01); *H04W 76/28* (2018.02); *H04W 80/02* (2013.01)

(58) Field of Classification Search
CPC ............. H04W 76/19; H04W 28/0268; H04W 72/1263; H04W 74/0833; H04W 76/28; H04W 80/02; H04W 28/0231
See application file for complete search history.

(56) References Cited

U.S. PATENT DOCUMENTS

| | | | |
|---|---|---|---|
| 2010/0098051 A1* | 4/2010 | Uemura | ............ H04W 56/0015 370/350 |
| 2012/0208471 A1* | 8/2012 | Shima | ............... H04W 52/0258 455/68 |

(Continued)

FOREIGN PATENT DOCUMENTS

| | | |
|---|---|---|
| WO | 2019030163 A1 | 2/2019 |
| WO | WO-2021001480 A1 * | 1/2021 |

OTHER PUBLICATIONS

International Search Report and Written Opinion—PCT/US2021/017882—ISA/EPO—dated Apr. 22, 2021.

(Continued)

*Primary Examiner* — Harry H Kim
(74) *Attorney, Agent, or Firm* — Patterson+ Sheridan, L.L.P.

(57) ABSTRACT

Certain aspects of the present disclosure provide techniques for wireless communications, and more particularly, to detecting data inactivity and expediting recovery action. A method that may be performed by a user equipment (UE) includes maintaining at least one inactivity timer to detect when uplink or downlink data transfer between the UE and network has stalled and expediting one or more recovery actions if the inactivity expires due to one or more conditions.

28 Claims, 12 Drawing Sheets

1100

1102
MAINTAIN AT LEAST ONE INACTIVITY TIMER TO DETECT WHEN UPLINK OR DOWNLINK DATA TRANSFER BETWEEN THE UE AND NETWORK HAS STALLED

1104
EXPEDITE ONE OR MORE RECOVERY ACTIONS IF THE INACTIVITY EXPIRES DUE TO ONE OR MORE CONDITIONS

(56) References Cited

U.S. PATENT DOCUMENTS

| | | | | |
|---|---|---|---|---|
| 2013/0294307 | A1* | 11/2013 | Johansson | H04W 76/28 370/311 |
| 2015/0334588 | A1* | 11/2015 | Cui | H04W 36/26 370/252 |
| 2018/0110005 | A1* | 4/2018 | Yu | H04W 52/0225 |
| 2019/0098689 | A1* | 3/2019 | Wei | H04W 76/28 |
| 2019/0394824 | A1* | 12/2019 | Turtinen | H04W 76/19 |
| 2020/0146059 | A1* | 5/2020 | Cirik | H04W 72/23 |
| 2020/0314681 | A1* | 10/2020 | Kuo | H04W 72/569 |
| 2021/0007036 | A1* | 1/2021 | Park | H04W 76/19 |
| 2021/0144762 | A1* | 5/2021 | Tsai | H04W 74/0833 |
| 2021/0203400 | A1* | 7/2021 | Babaei | H04W 80/02 |
| 2021/0282176 | A1* | 9/2021 | Han | H04W 74/0833 |
| 2021/0337453 | A1* | 10/2021 | Gao | H04B 7/0695 |
| 2022/0022137 | A1* | 1/2022 | Xue | H04W 72/0466 |

OTHER PUBLICATIONS

LG Electronics: "Remaining Issue on PC5 RLW", 3GPP TSG-RAN WG2 Meeting #108, 3GPP Draft, R2-1915515, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), 3 Pages, XP051817257, Retrieved from the Internet: URL: https://www.3gpp.org/ftp/Meetings_3GPP_SYNC/RAN2/Docs/R2-1915515.zip, R2-1915515 Remaining issues on SL RLM. doc [retrieved-on Nov. 8, 2019], p. 2.

Qualcomm Inc: "Avoid UEs Staying in RRC Connected State Unnecessarily", 3GPP TSG-RAN WG2 Meeting #95BIS, 3GPP Draft, Discussionpaper RRC Desync R2-167077 V1, 3rd Generation Partnership Project (3GPP), Mobile Competence Centre, 650, Route Des Lucioles, F-06921 Sophia-Antipolis Cedex, France, vol. RAN WG2, No. Kaohsiung, Taiwan, Oct. 10, 2016-Oct. 14, 2016, Oct. 9, 2016 (Oct. 9, 2016), 3 Pages, XP051150628, Retrieved from the Internet: URL: https://www.3gpp.org/ftp/tsg_ran/WG2_RL2/TSGR2_95bis/Docs/[retrieved on Oct. 9, 2016].

* cited by examiner

DATA INACTIVITY INDICATION AND EXPEDITED RECOVERY ACTION

CROSS-REFERENCE TO RELATED APPLICATIONS

This application claims benefit of and priority to U.S. Provisional Application No. 62/975,622, filed Feb. 12, 2020, which is assigned to the assignee hereof and hereby expressly incorporated by reference herein in its entirety as if fully set forth below and for all applicable purposes.

TECHNICAL FIELD

Aspects of the present disclosure relate to wireless communications, and more particularly, to detecting data inactivity and expediting recovery action.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to detecting data inactivity and expediting recovery action.

Certain aspects can be implemented in a method for wireless communication by a user equipment (UE). The method generally includes maintaining at least one inactivity timer to detect when uplink or downlink data transfer between the UE and network has stalled and expediting one or more recovery actions if the inactivity expires due to one or more conditions.

Certain aspects can be implemented in an apparatus for wireless communication by a user equipment (UE). The apparatus may include a processing system, comprising: a memory comprising computer-executable instructions and one or more processors configured to execute the computer-executable instructions and cause the processing system to: maintain at least one inactivity timer to detect when uplink or downlink data transfer between the UE and network has stalled and expedite one or more recovery actions if the inactivity expires due to one or more conditions.

Certain aspects can be implemented in an apparatus for wireless communication by a user equipment (UE). The apparatus may include means for maintaining at least one inactivity timer to detect when uplink or downlink data transfer between the UE and network has stalled and means for expediting one or more recovery actions if the inactivity expires due to one or more conditions.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: maintain at least one inactivity timer to detect when uplink or downlink data transfer between the UE and network has stalled and expedite one or more recovery actions if the inactivity expires due to one or more conditions.

Certain aspects can be implemented in a computer program product for wireless communication by a user equipment (UE) embodied on a computer-readable storage medium. The computer-readable storage medium may comprise code for maintaining at least one inactivity timer to detect when uplink or downlink data transfer between the UE and network has stalled and expediting one or more recovery actions if the inactivity expires due to one or more conditions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
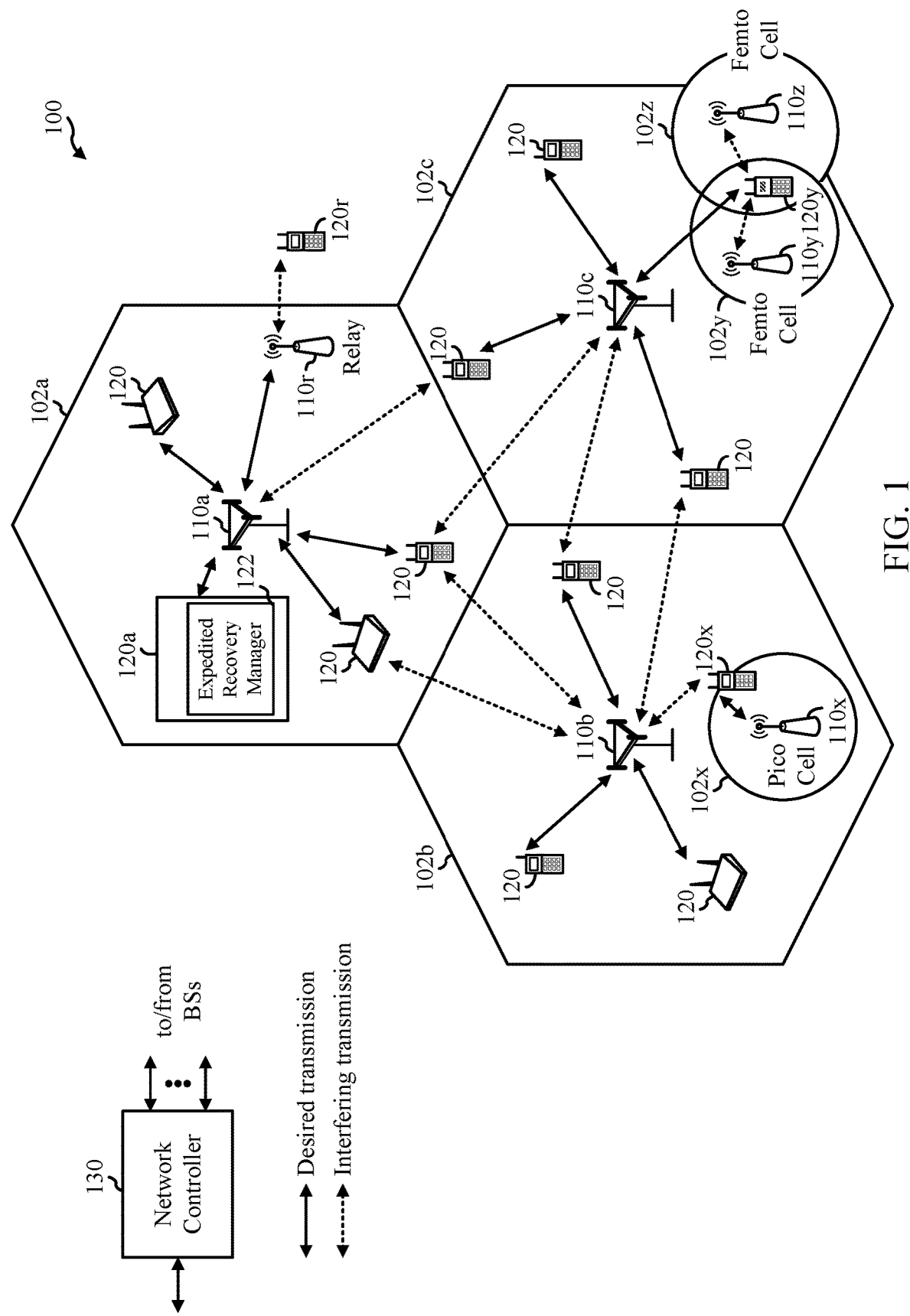
FIG. 1 is a block diagram conceptually illustrating an example telecommunications system, in accordance with certain aspects of the present disclosure.

Aspects of the present disclosure relate to wireless communications, and more particularly, to detecting data inactivity and expediting recovery action. For example, in certain cases data activity (e.g., transmission/reception) can be stalled or gated at a user equipment (UE) in a network for various reasons in the uplink (UL) and downlink (DL). Such stalling of data activity may lead to an increase in latency associated with transmission/reception at the UE and poor user experience. Thus, aspects of the present disclosure provide techniques to expedite recovery actions when the stalling of the data activity is due to one or more particular causes. By expediting the recovery actions, the UE is able to more-quickly recover a connection with the network and alleviate the stalled data activity.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communication System

FIG. 1 illustrates an example wireless network 100 in which aspects of the present disclosure may be performed. For example, one or more UEs 120, such as UE 120a, may include an expedited recovery manager 122. The expedited recovery manager 122 may be configured to perform the operations 1100 of FIG. 11, as well as other operations disclosed herein for detecting data inactivity and expediting recovery action.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
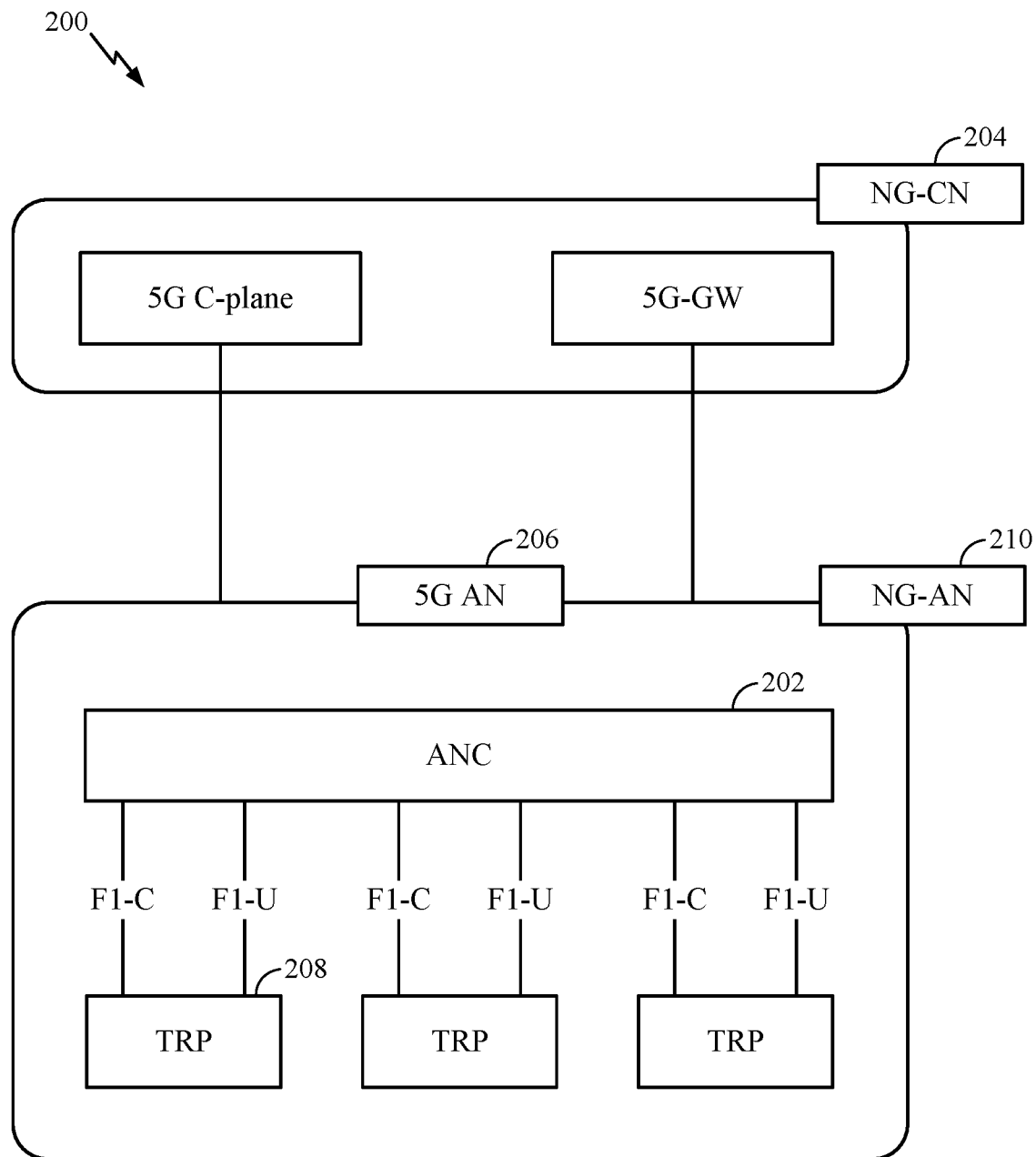
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
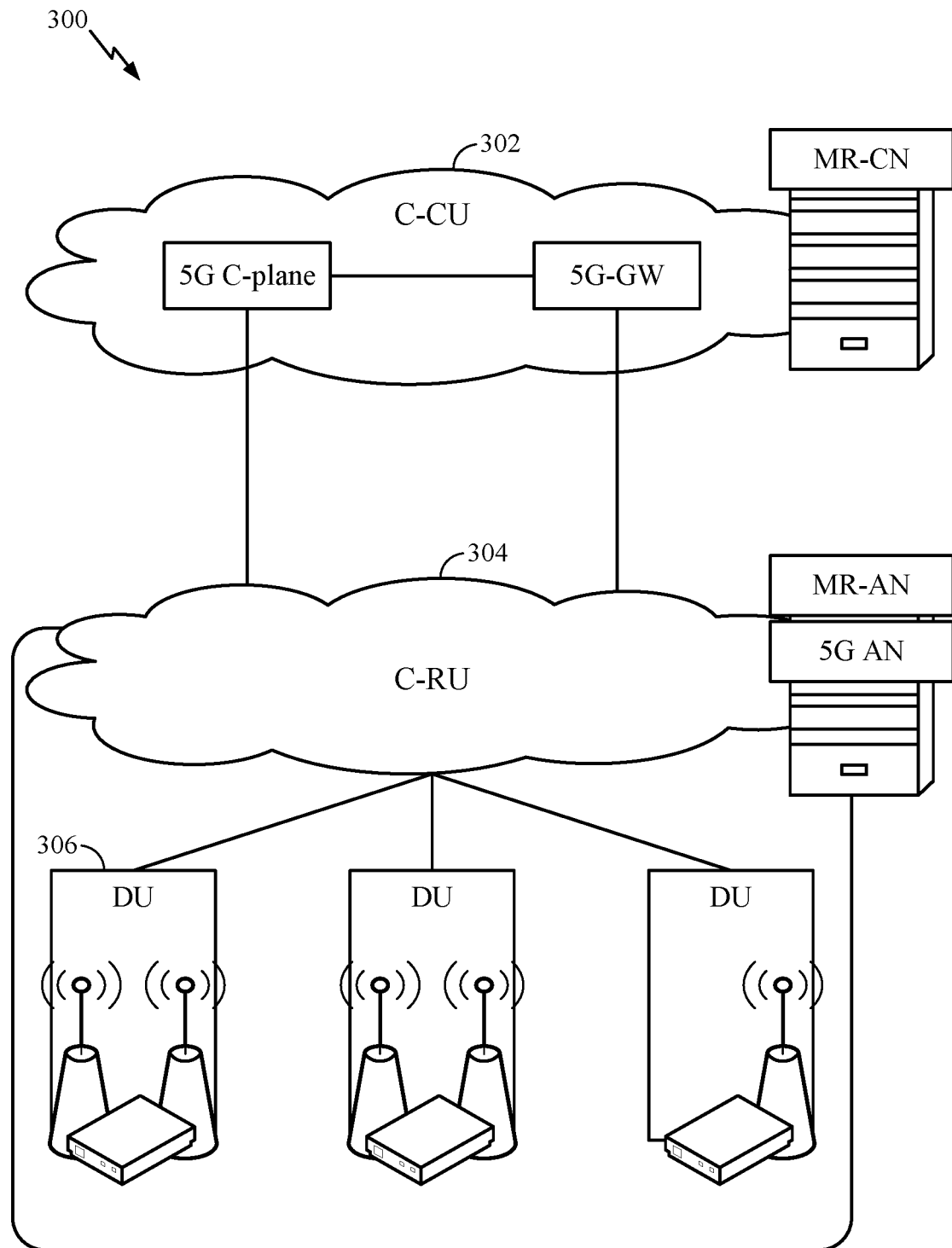
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
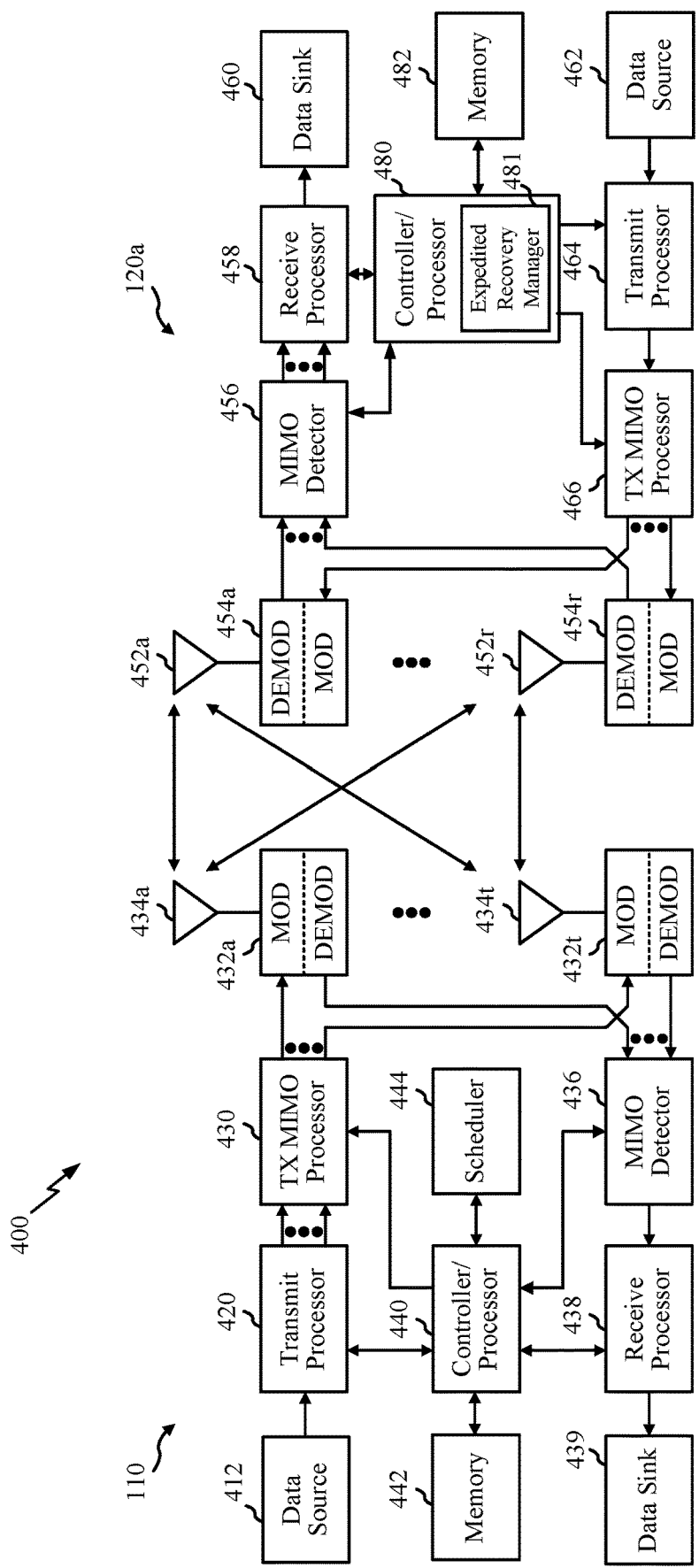
FIG. 4 is a block diagram conceptually illustrating a design of an example BS and UE, in accordance with certain aspects of the present disclosure.

FIG. 4 illustrates example components of the BS 110 and UE 120a illustrated in FIG. 1, which may be used to implement aspects of the present disclosure. The BS may include a TRP or gNB.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator in transceivers 432a-432t may further process (e.g., convert to analog, amplify, filter, and upconvert) the output sample stream to obtain a downlink signal. Downlink signals from modulators in transceivers 432a-432t may be transmitted via the antennas 434a-434t, respectively.

At the UE 120, the antennas 452a-452r may receive the downlink signals from the base station 110 and may provide received signals to the demodulators (DEMODs) in transceivers 454a-454r, respectively. Each demodulator in transceivers 454a-454r may condition (e.g., filter, amplify, downconvert, and digitize) a respective received signal to obtain input samples. Each demodulator in transceivers 454a-454r may further process the input samples (e.g., for OFDM, etc.) to obtain received symbols. A MIMO detector 456 may obtain received symbols from all the demodulators in transceivers 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at the UE 120a, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the modulators in transceivers 454a-454r (e.g., for SC-FDM, etc.), and transmitted to the base station 110. At the BS 110, the uplink signals from the UE 120a may be received by the antennas 434a-434t, processed by the modulators in transceivers 432a-432t, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110 and UE 120a, respectively. A scheduler 444 may schedule UEs for data transmission on the downlink and/or uplink.

Antennas 452, processors 466, 458, 464, and/or controller/processor 480 of the UE 120a may be used to perform the various techniques and methods described herein. For example, as shown in FIG. 2, the controller/processor 480 of the UE 120a includes an expedited recovery manager 281 that may be configured to perform the operations illustrated in FIG. 11, as well as other operations described herein for detecting data inactivity and expediting recovery action. Although shown at the controller/processor, other components of the UE 120a and BS 110 may be used to perform the operations described herein.

Figure 5:
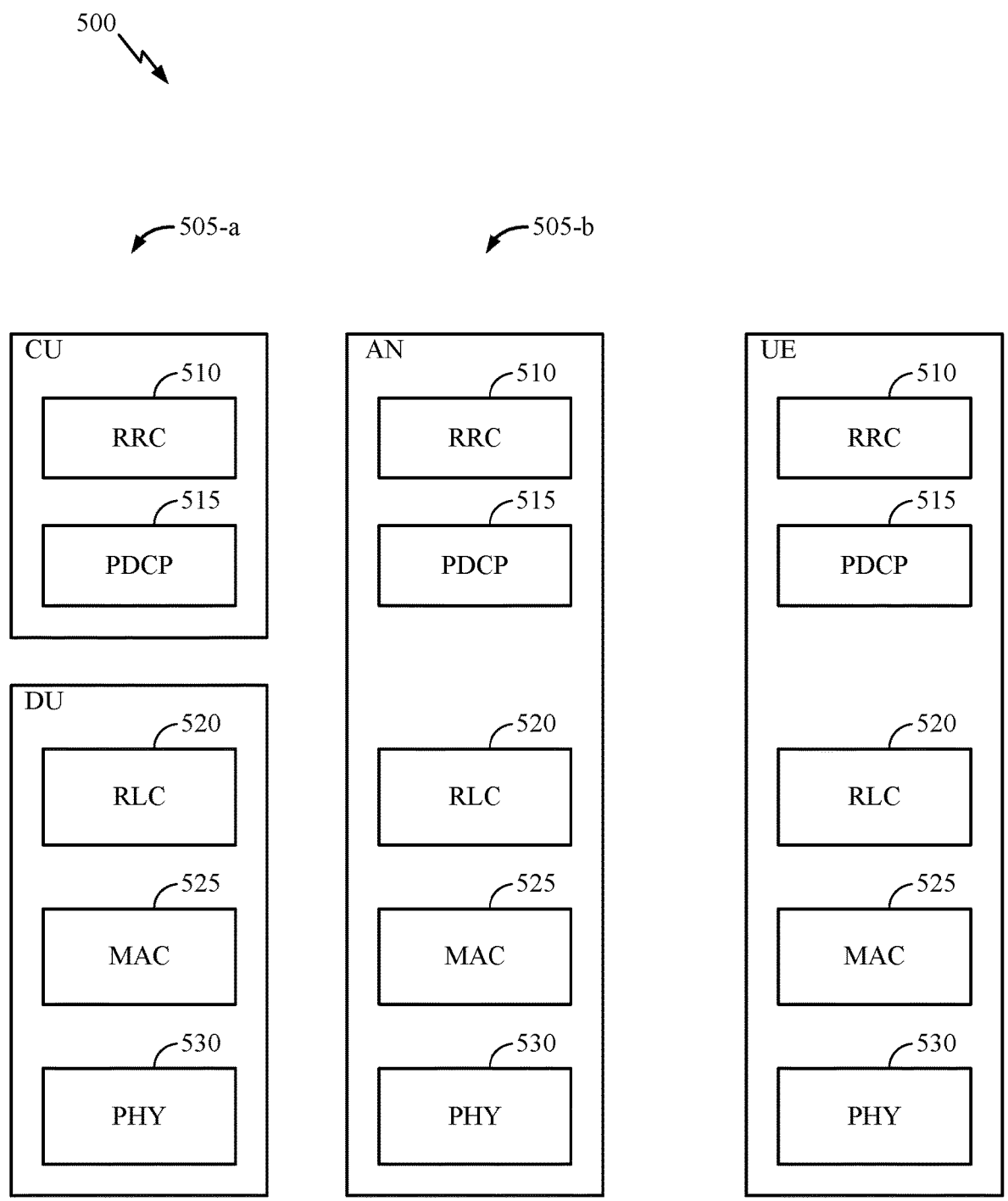
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
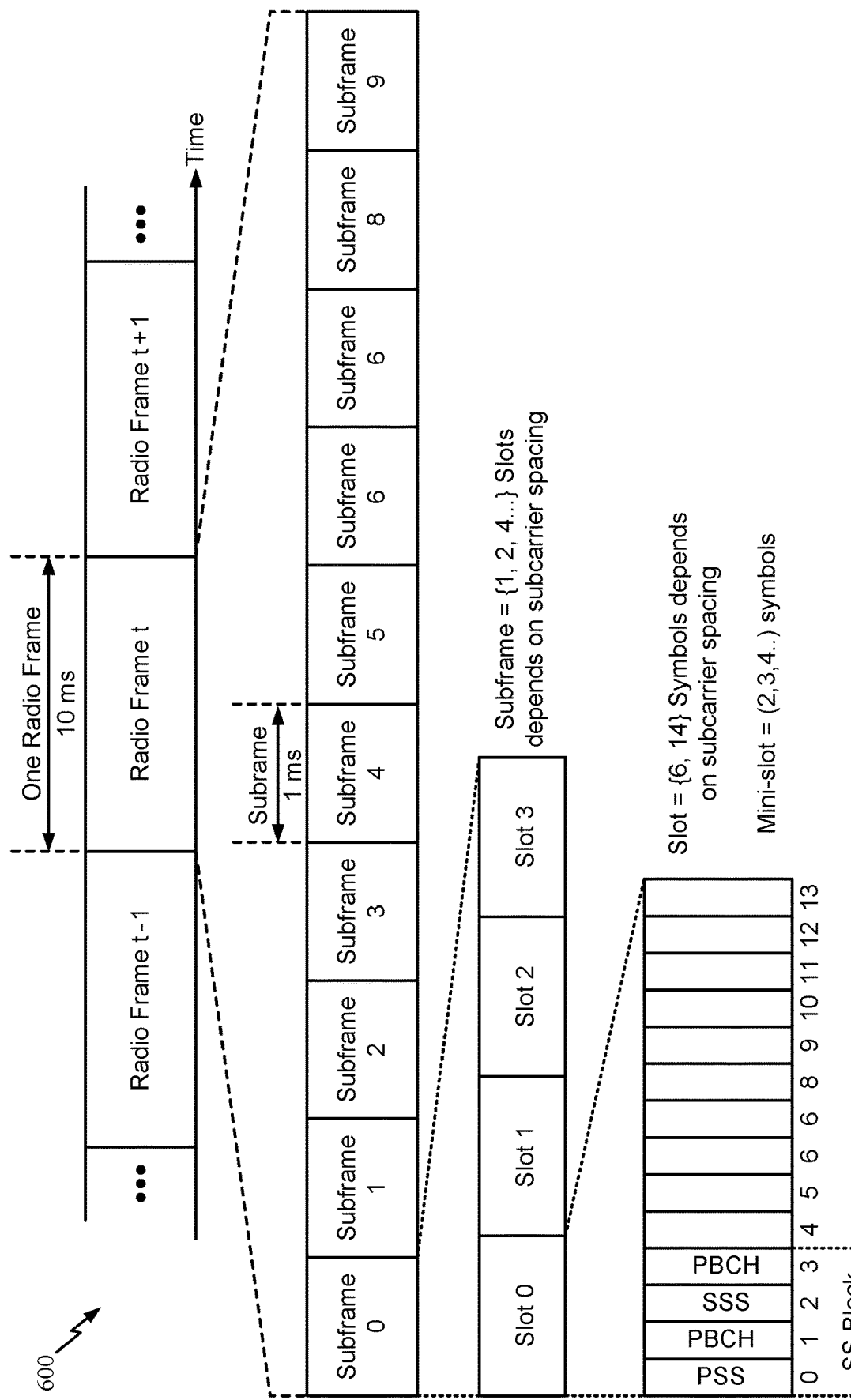
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedures

As noted above, in certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPS) or as fallback BPLs in case an existing BPL fails.

The UE typically monitors the quality of a BPL and the network may refine a BPL from time to time.

Figure 7:
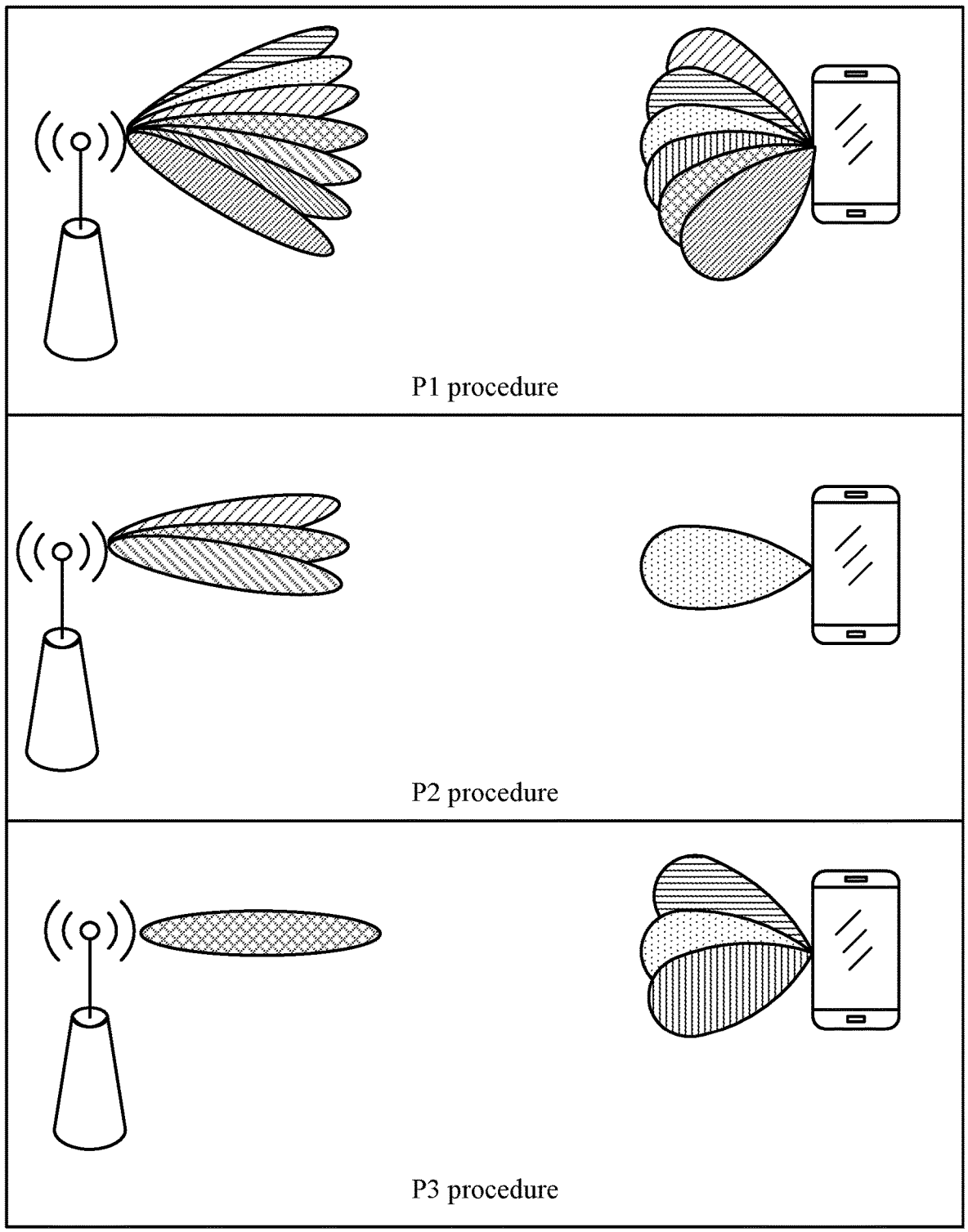
FIG. 7 illustrates an example of a P1, P2, and P3 procedure, in accordance with certain aspects of the present disclosure.

FIG. 7 illustrates examples for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 7, the BS transmits different symbols of a reference signal, each beam formed in a different spatial direction such that several (most, all) relevant places of the cell are reached. Stated otherwise, the BS transmits beams using different transmit beams over time in different directions.

For successful reception of at least a symbol of this "P1-signal", the UE has to find an appropriate receive beam. It searches using available receive beams and applying a different UE-beam during each occurrence of the periodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 7). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 7). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Over time, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS may use a BPL which the UE has received in the past. The transmit beam for the signal to be transmitted and the previously-received signal both point in a same direction or are QCL. The QCL indication may be needed by the UE (in advance of signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

As noted above, wireless systems, such as millimeter wave (mmW) systems, bring gigabit speeds to cellular networks, due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. Active beams may be considered paired transmission (Tx) and reception (Rx) beams between the NB and UE that carry data and control channels such as PDSCH, PDCCH, PUSCH, and PUCCH. As noted above, a transmit beam used by a NB and corresponding receive beam used by a UE for downlink transmissions may be referred to as a beam pair link (BPL). Similarly, a transmit beam used by a UE and corresponding receive beam used by a NB for uplink transmissions may also be referred to as a BPL.

In order for beamforming to function correctly, the NB may need to monitor beams using beam measurements performed (e.g., based on reference signals transmitted by the NB) and feedback generated at the UE. For example, the NB may monitor active beams using UE-performed measurements of signals such as NR-SS, CSI-RS, DMRS-CSS and DMRS-USS. For that, NB may send measurement request to the UE and may subsequently transmit one or more reference signals for measurement at the UE.

Since the direction of a reference signal is unknown to the UE, the UE may need to evaluate several beams to obtain the best Rx beam for a given NB Tx beam. However, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Figure 8:
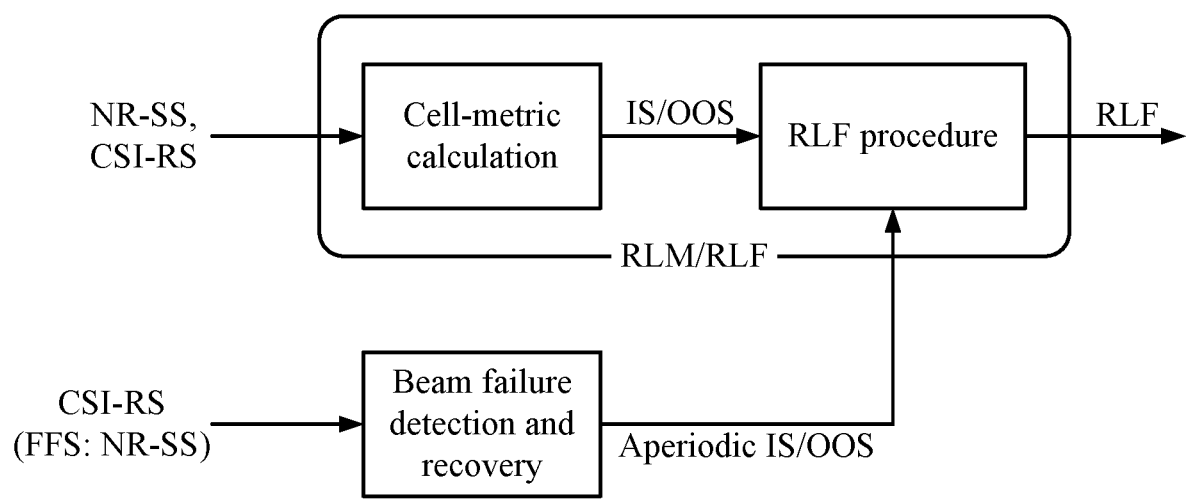
FIG. 8 illustrates example considerations that may affect a radio link failure (RLF) procedure.

As illustrated in FIG. 8, in multi-beam systems, a radio link failure (RLF) procedure, based on radio link monitoring (RLM) measurements, may be enhanced by aperiodic in-sync (IS) and out-of-sync (OSS) triggers. The IS and OSS triggers may be initiated by a beam failure recovery (BFR) procedure. For RLM, at least periodic IS and OOS indications may be based on signal to interference and noise (SINR)-like metrics. Such metrics may include, for example, a hypothetical PDCCH block error rate (BLER) as in LTE. For a BFR procedure, at least aperiodic indication(s) may be provided to assist with the radio link failure (RLF) procedure. For example, such aperiodic indications may be provided if a same RS is used for beam failure recovery and RLM procedures.

In some cases, there may be discrepancies between cell quality metrics used by the RLF procedure and beam quality metrics used by the BFR procedure. In some cases, these discrepancies may lead to inefficient RLF performance.

Figure 9:
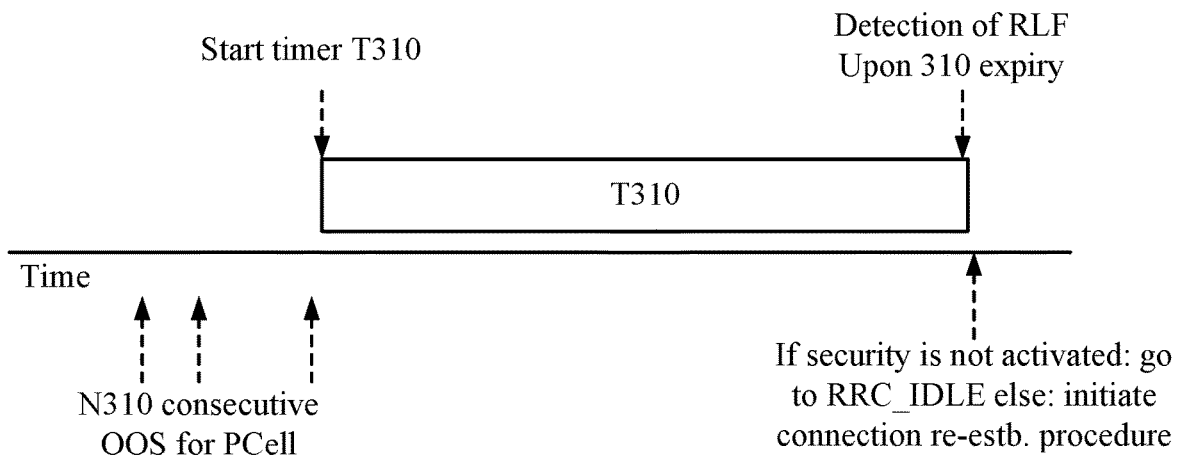
FIG. 9 illustrates an example RLF timer and triggers for initiating the RLF timer.

An example of such an inefficiency may be explained with reference to FIG. 9. FIG. 9 illustrates an example RLF timer and triggers for initiating the RLF timer. As illustrated, after a threshold number of consecutive OOS indications (referred to as N310) for the primary cell (Pcell), a timer (referred to as a T310 timer) may be activated. After expiration of the T310 timer (e.g., absent a number of detected IS events), an RLF may be declared.

This may result in unnecessarily RLFs being declared. These unnecessary declarations may occur particularly in cases of "low SS-block geometry" where the UE is not reachable by beams carrying RS for RLM, but is reachable by narrower beams carrying SS.

Figure 10:
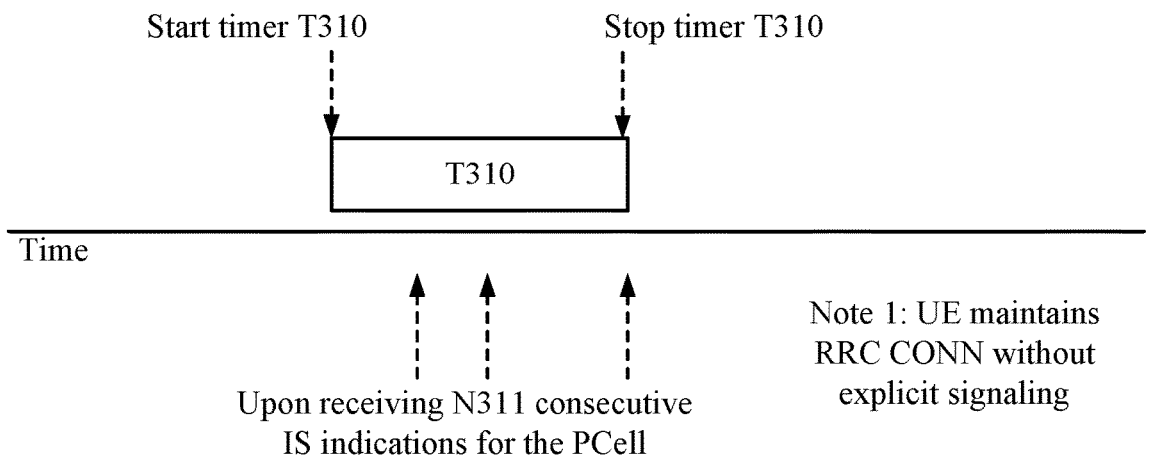
FIG. 10 illustrates an example RLF timer and triggers for terminating the RLF timer.

As another example of inefficiency, in some cases, RLFs may be unnecessarily delayed. For example, as illustrated in FIG. 10, the RLF timer may be stopped upon receiving a threshold number (N311) of consecutive IS indications for Pcell. Unfortunately, this may delay an RLF from being declared in cases when beam failure detection actually occurs and there are no candidate beams for recovery.

Example Data Inactivity Indication and Expedited Recovery Action

In some cases, data activity (e.g., transmission/reception) can be held up (e.g., gated or stalled) at a user equipment (e.g., UE 120*a*) for various reasons in the uplink (UL) and downlink (DL). This gating can be due to various protocol specific or non-protocol specific reasons.

Non-protocol specific reasons may occur even when the UE is in suitable radio conditions in a current cell and all physical (PHY) layer characteristics are in good condition with the network (NW). For example, in such conditions, PDCCH transmissions generally always decode successfully and power control and channel state information (CSI) indications are all suitable. In such cases, the current cell may be suitable, with the UE experiencing good reference signal strength indicator (RSSI) or reference signal receive power (RSRP) to continue in the current cell.

However, in some cases, non-protocol specific reasons may result in stalls in UL data transfer from the UE when the UE has some UL data from modem internal or application generated (e.g., data from an internal modem or generated by an application). For example, the UE may be reporting a scheduling request (SR) and buffer status report (BSR) information to the NW (e.g., indicating uplink data to transmit), but the NW may not be allocating the grant on a physical uplink shared channel (PUSCH), as expected, which would allow the UL data to be transmitted to the gNB/eNB (e.g., BS 110). In other cases, the NW may granting some resources to the UE for UL transmission, but just enough resources for the UE to transmit the BSR. In other words, in such cases, the amount of resources granted may be just enough to handle the transmission of the BSR but may not be enough to allow the UE to transmit UL data for which the BSR is sent.

Non-protocol specific reasons may result in stalls in DL data transfer to the UE when the UE is expecting some DL data from the gNB either specific to a radio level or application level. In such cases, the UE may be decode a physical downlink control channel (PDCCH) successfully and, while the UE is in good radio conditions, expected scheduling for the DL data is not included in the PDCCH or PDSCH in DL.

Such UL/DL data stalling in the UE/NW due to non-protocol specific reasons, without any apparent poor radio activity, may result in increased transmission/reception latency and a poor user experience at an application/end-user of the UE. In some cases, such transmission/reception latency may be especially detrimental in certain wireless communication systems incorporating non-terrestrial network entities, such as the wireless communication network 1200, which are prone to issues with round trip delay (RTD) and frequency shift.

Protocol specific reasons may also result in stalls when the UE is experiencing suitable radio conditions and all the PHY layer characteristics are in suitable shape with the NW, again meaning PDCCH decoding is good and power control and CSI indications are all good. In such cases, the current cell is suitable, with the UE experiencing good RS SI or RSRP to continue in the current cell.

Protocol specific reasons may result in stalls in UL data transfer from the UE, when the UE has some UL data from Modem internal or Application generated (e.g., from an internal modem or generated by an application). For example, the UE may be try to initiate an SR procedure, which may fail, causing the UE to fall back to a random access channel (RACH) procedure which, in turn may fail, causing the UE to fall back to a lengthy cell reselection procedure.

Protocol specific reasons may include the UE and NW being out of synchronization (sync), for example, with respect to radio level configuration during ongoing call. In some cases, the UE and NW might be out of sync with respect to a connected discontinuous reception (C-DRX) procedure. For example, in some cases, the UE might be in a CDRX OFF mode while the NW is (and/or assumes the UE to be) in a CDRX ON mode.

In some cases, the UE and NW might be out of sync with respect to an active bandwidth part (BWP). For example, the UE may be in a configured BWP X, while the NW assumes UE to be in default BWP Y (or vice-versa).

Various other radio procedures may also lead a UE to be out of sync. Examples of such procedures may include ciphering parameters or integrity parameters or MAC CE procedures which enabled/disables CC/duplication/activation/deactivation of different features or different access class barring assumptions.

These various reasons may result in substantial transmission/reception delays. For example, a maximum number of SR retransmissions may need to occur before a RACH procedure is attempted, which may lead to substantial delays (e.g., 64×128 ms). Thereafter, a maximum number of RACH preambles may need to be attempted (with a back off time) before a radio link failure (RLF) is declared before a radio resource control (RRC) IDLE, RRC connection failure, and/or RRC connection reestablishment procedure is finally performed.

RACH procedures are well defined, with back-off timers and number of RACH attempts governed by the RRC and MAC specifications, which can cause lot of delay in some configurations, especially when the UE is part of the contention-free random access (CFRA) with limited radio resources. In some cases, a RACH procedure can be tried in the worst case with up to 200 preambles and with back-off timer, which might result in few 10s of ms before UE declares RLF and leads into new RRC connection through RRC_IDLE procedure or reestablishment.

Whether the UE is experiencing no transmission due to genuine protocol reasons (e.g., SR→RACH→RRC_IDLE→Connection Setup, out-of-sync feature/protocol state between NW and UE) or due to NW scheduling reasons (e.g., no UL grant or no DL Scheduling or quality of service (QoS) issues or service level agreement or NW Side database issues), an application which is being used by a user of the UE will not have active data transfer, resulting in bad user experience.

Therefore, aspects of the present disclosure provide techniques that may help quickly detect such stalling and perform recovery actions, whether the stalling is detected at the modem or application processor level. As will be described herein, the techniques may enable a UE to detect data inactivity and expedite recovery action to quickly establish another connection either on the same or different cell.

Figure 11:
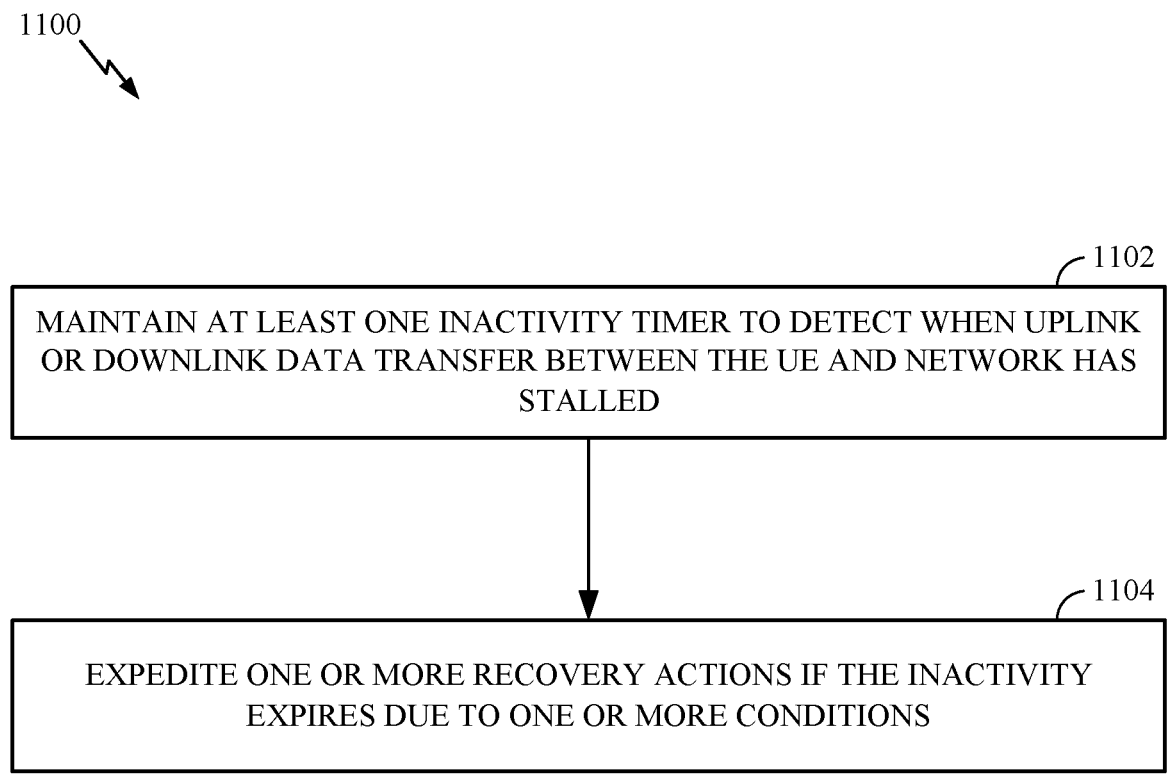
FIG. 11 illustrates example operations that may be performed by a user equipment (UE), in accordance with aspects of the present disclosure.

FIG. 11 illustrates example operations 1100 that may be performed by a UE to detect data inactivity and expedite recovery action. Operations 1100 may be performed, for example, by a user equipment (e.g., UE 120a) participating in communications with a base station (e.g., a gNB, such as BS 110) within a wireless communication network, such as the wireless communication network 100 of FIG. 1 and/or the wireless communication network 1200 of FIG. 12.

Operations 1100 begin, at 1102, by maintaining at least one inactivity timer to detect when uplink or downlink data transfer between the UE and network has stalled.

At 1104, the UE expedites one or more recovery actions if the inactivity expires due to one or more conditions.

In some cases, the UE may maintain an uplink inactivity timer (T_ul_inactivity) and/or a downlink inactivity timer (T_dl_inactivity), for example, which may be different from the T310 timers illustrated in FIGS. 9 and 10.

In some cases, on new data arrival into a modem layer (L2) of the UE from any application in the modem, application processor, or tethered client, the UE may start the timer T_ul_inactivity.

In some cases, the T_dl_inactivity timer may be started if/when DL data is expected either in the modem or in an application processor of the UE, for example, based on respective protocol knowledge. In some cases, this timer may be tied to Layer 2 in the modem level expecting feedback from a peer Layer 2 or it may be tied to an Application (TCP/HTTP) in the application processor level expecting feedback from a peer application (TCP/HTTP).

In some cases, if no data is transmitted within a period of time defined by the T_ul_inactivity timer (e.g., before expiration) from the modem level of the UE, the UE may determine the reason behind no data being transmitted and look into further actions based on the reason. If some UL data is transmitted in the T_ul_inactivity time period, the timer can be stopped or restarted.

Similarly, for DL traffic, when the T_dl_inactivity is started and when no data is received within a period of time defined by the T_dl_inactivity timer (e.g., before expiration), the UE may determine the reason behind no data being received and look into further actions based on the reason. If some DL data is received within the T_dl_inactivity period, this timer can be stopped or restarted.

In some cases, if an inactivity timer (e.g., T_ul_inactivity or T_dl_inactivity) expires, the UE may take action to expedite recovery procedures.

For example, if the T_ul_inactivity timer expired the UE may declare an RLF immediately and may expedite performing an RRC_IDLE or RRC connection procedure. In some cases, the UE may expedite the RRC_IDLE or RRC connection procedure, for example, if the reason for expiration of the T_ul_inactivity timer is one of the following:

(1) an ongoing SR/RACH procedure;
(2) a lack of data transmission in UL or lack of data acknowledgement in DL (L2 Status, if needed); or
(3) there is a mismatch in configuration between NW and UE (e.g., a mismatch in a C-DRX state, a mismatch in BWP configuration, a mismatch in ciphering or integrity parameters, a mismatch in MAC CE procedures, or a mismatch in access class barring assumptions).

Similarly, if the T_dl_inactivity expired, the UE may declare an RLF immediately and expedite performance of the RRC_IDLE or RRC Connection procedure. In some cases, the UE may expedite the RRC_IDLE or RRC connection procedure, for example, if the reason for expiration of the T_dl_inactivity timer is one of the following:

(4) a DL status is not received for UL data at Layer 2;
(5) DL traffic (e.g., transmission control protocol (TCP) acknowledgement (ACK) or TCP response or App response) are not received within the time period defined by the T_dl_inactivity timer; or (6) there is a mismatch in configuration between NW and UE (e.g., as explained above).

According to aspects, early inactivity detection and expedited recovery action in this manner may help avoid delay in performing the RLF/connection reestablishment procedure to establish a new connection for active data transmission/reception, thereby reducing transmission/reception latency at the UE.

In some cases, values for the T_ul_inactivity timer and T_dl_inactivity timer may be appropriately chosen, for example, based on the modem/application processor the type of data, application requirements (e.g., latency, QOS, Service Level agreements), modem technology, a radio environment (e.g., channel conditions), and the like. For example, an aggressive value for one of these timers may cause wastage of the radio signaling procedures, but may be justified based on the customer requirements on response times and user perceived experience.

In some cases, timer values can also be adaptable based on the data type, volume of the data, and/or service type. For example, for ultra-reliable low-latency communication (URLLC) service type data, timer values may be much shorter than for other types of service types.

Apart from recovery action in the modem, this information (e.g., information regarding the inactivity timer or the one or more recovery actions) can be indicated to a client (modem/AP/tethered client) or application for appropriate recovery action at an application level (e.g., retry, switch to different radio access technology (RAT), different action based on the characteristics) or for information purposes. In some cases, the appropriate recovery action may include closing and opening a transmission control protocol (TCP) session at the application level, triggering a multi-path TCP (MPTCP) kind of session, or restarting a connection at the application level. Additionally, in some cases, there may be additional in-band signaling at the application level for recovery, such as dynamically adjusting a coding rate or bandwidth.

Example Non-Terrestrial Network

Figure 12:
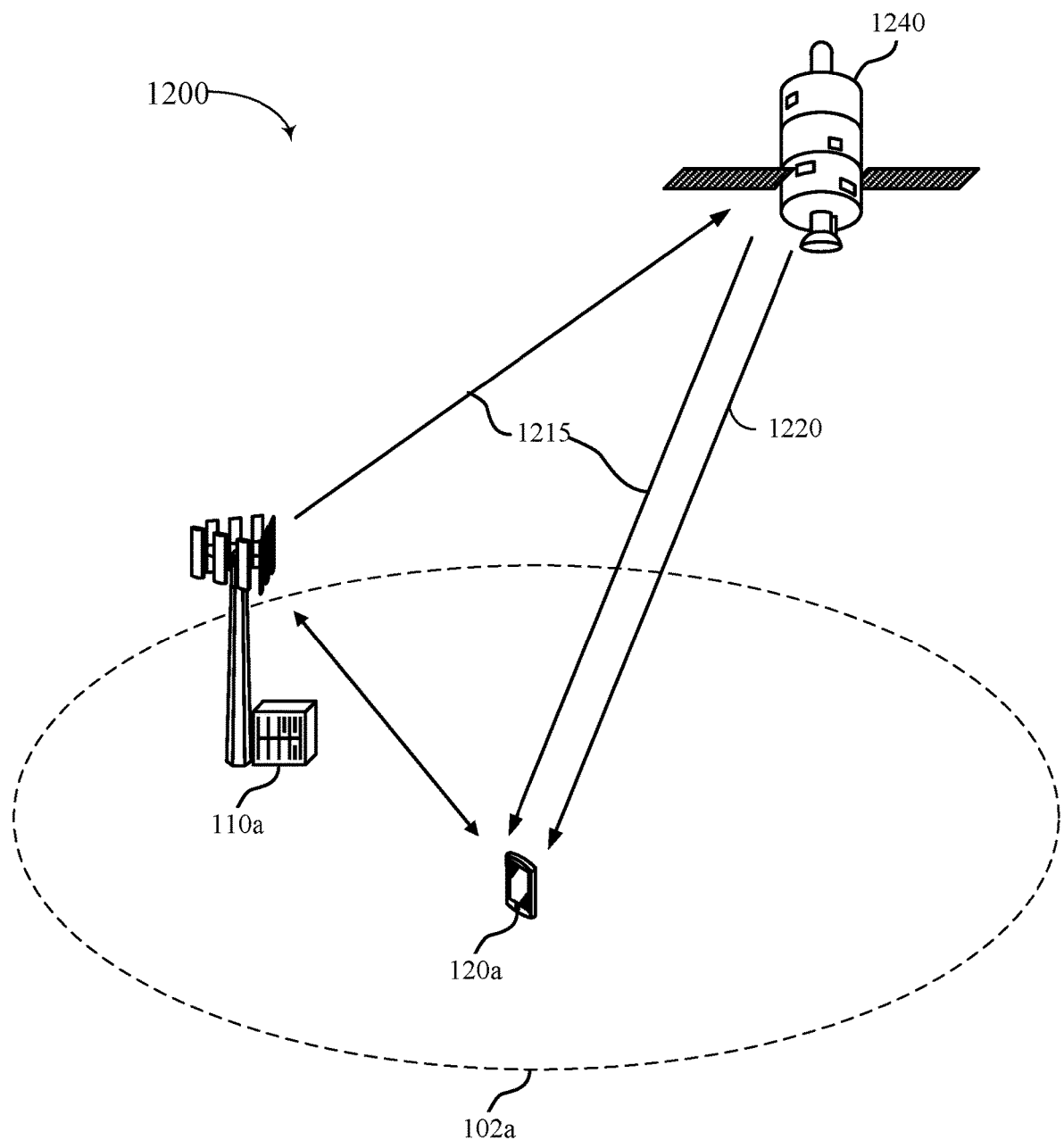
FIG. 12 is a diagram illustrating an example wireless communication network having a non-terrestrial network entity, in accordance with certain aspects of the present disclosure.

FIG. 12 illustrates an example of a wireless communications network 1200 including a non-terrestrial network entity 1240, in which aspects of the present disclosure may be practiced. In some examples, the wireless communications network 1200 may implement aspects of the wireless communication network 100. For example, the wireless communications network 1200 may include BS 110a, UE 120a, and non-terrestrial network entity 1240, such as a satellite. BS 110a may serve a coverage area or cell 102a in cases of a terrestrial network, and non-terrestrial network entity 1240 may serve the coverage area 102a in cases of a non-terrestrial network (NTN). Some NTNs may employ airborne platforms (e.g., a drone or balloon) and/or space-borne platforms (e.g., a satellite).

The non-terrestrial network entity 1240 may communicate with the BS 110a and UE 120a as part of wireless communications in an NTN. In cases of a terrestrial network, the UE 120a may communicate with the BS 110a over a communication link. In the case of NTN wireless communications, the non-terrestrial network entity 1240 may be the serving cell for the UE 120a via a communication links 1220. In certain aspects, the non-terrestrial network entity 1240 may act as a relay for the BS 110a and the UE 120a, relaying both data transmission and control signaling 1215.

The non-terrestrial network entity 1240 may orbit the earth's surface at a particular altitude. The distance between the non-terrestrial network entity 1240 and UE 120a may be much greater than the distance between BS 110a and UE 120a. The distance between the UE 120a and the non-terrestrial network entity 1240 may cause an increased round-trip delay (RTD) in communications on the communication links 1220 between the UE 120a and the non-terrestrial network entity 1240. The motion of the non-terrestrial network entity 1240 may cause a Doppler effect and contribute to a frequency shift in communications between the UE 120a and the non-terrestrial network entity 1240. The frequency shift may be also contributed to by error related to the local oscillation of either the UE 120a or the non-terrestrial network entity 1240. The RTD and frequency shift associated with communications in NTNs may lead to inefficiency in transmissions, latency, and inability to accurately transmit and receive messages.

The UE 120a may determine to connect to the non-terrestrial network entity 1240 using a random access (RA) procedure (e.g., a four-step RA procedure or a two-step RA procedure). The initiation of the RA procedure may begin with the transmission of a RA preamble (e.g., an NR preamble for RA) by the UE 120a to the non-terrestrial network entity 1240 or BS 110a. The UE 120a may transmit the RA preamble on a physical random access channel (PRACH). In some PRACH designs, there may be no estimation or accounting for the RTD or the frequency shift associated with NTNs. In certain networks, such as terrestrial NR networks (e.g., 5G NR), SSBs transmitted by a cell are transmitted on the same frequency interval (e.g., occupying the same frequency interval). In NTN, a satellite may use multiple antennas to form multiple narrow beams and the beams may operate on different frequency intervals to mitigate interference among the beams.

Example Wireless Communication Devices

Figure 13:
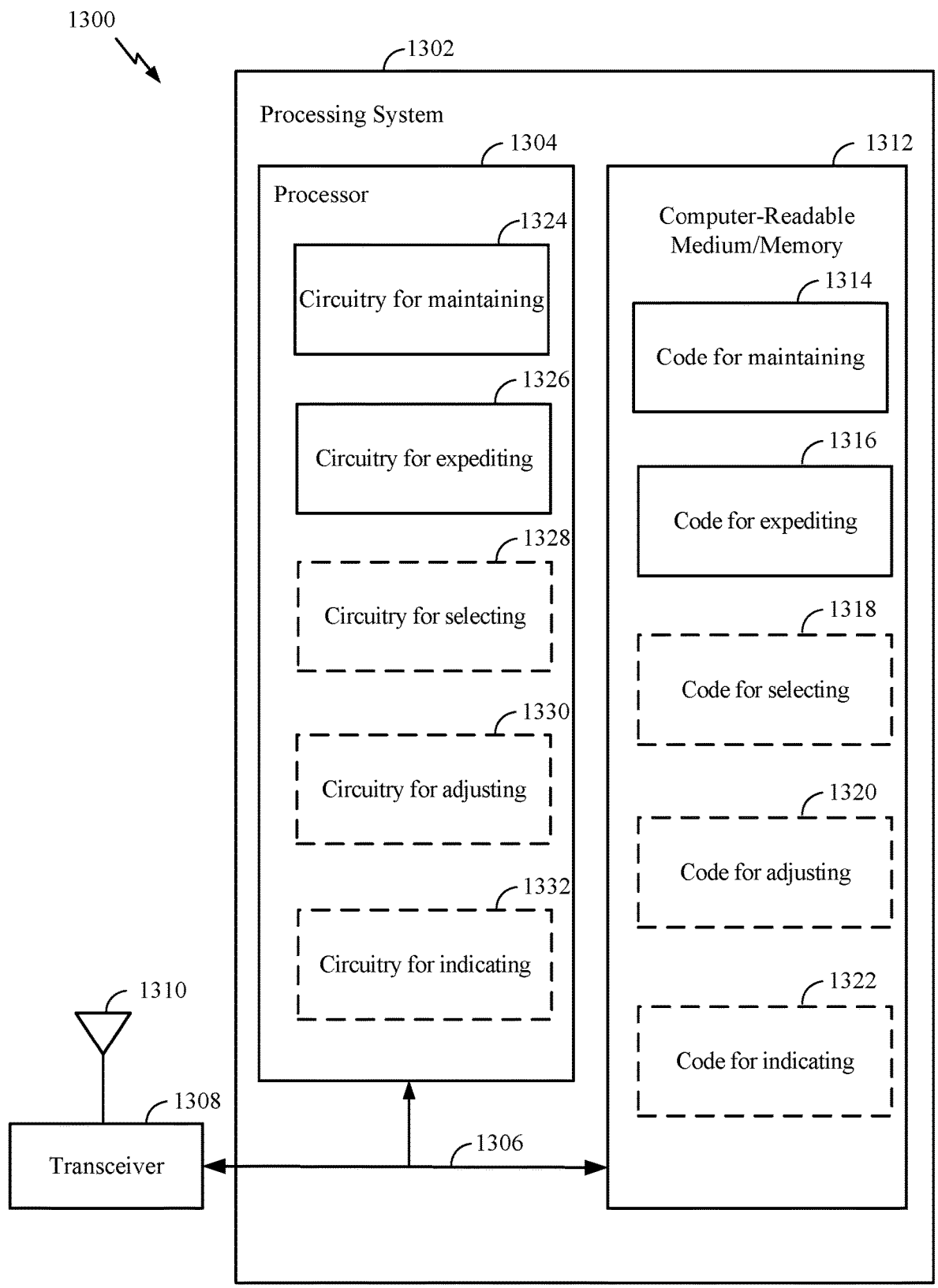
FIG. 13 illustrates an example wireless communications device configured to perform operations for the methods disclosed herein, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 11.

Communications device 1300 includes a processing system 1302 coupled to a transceiver 1308 (e.g., a transmitter and/or a receiver). Transceiver 1308 is configured to transmit and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations illustrated in FIG. 11 or other operations for performing the various techniques discussed herein for detecting data inactivity and expediting recovery action. In some cases, the processor 1304 can include one or more components of UE 130a with reference to FIG. 4 such as, for example, controller/processor 480, transmit processor 464, receive processor 458, and/or the like. Additionally, in some cases, the computer-readable medium/memory 1312 can include one or more components of UE 120*a* with reference to FIG. 4 such as, for example, memory 482 and/or the like.

In certain aspects, computer-readable medium/memory 1312 stores code 1314 for maintaining, code 1316 for expediting, code 1318 for selecting, code 1320 for adjusting, and code 1322 for indicating.

In some cases, code 1314 for selecting may include code for maintaining at least one inactivity timer to detect when uplink or downlink data transfer between the UE and network has stalled.

In some cases, code 1316 for expediting may include code for expediting one or more recovery actions if the inactivity expires due to one or more conditions.

In some cases, code 1316 for expediting may include code for declaring a radio link failure (RLF) and expediting a connection procedure if the uplink inactivity timer expires due to one or more particular causes.

In some cases, code 1318 for selecting may include code for selecting a value of the at least one inactivity timer based on one or more considerations.

In some cases, code 1320 for adjusting may include code for adjusting the value of the inactivity timer based on at least one of a data type or a volume of data.

In some cases, code 1322 for indicating may include code for indicating information to a client or application regarding at least one of: the inactivity timer or the one or more recovery actions.

In certain aspects, processor 1304 has circuitry configured to implement the code stored in the computer-readable medium/memory 1312. For example, processor 1304 includes circuitry 1324 for maintaining, circuitry 1326 for expediting, circuitry 1328 for selecting, circuitry 1330 for adjusting, and circuitry 1332 for indicating.

In some cases, circuitry 1324 for selecting may include circuitry for maintaining at least one inactivity timer to detect when uplink or downlink data transfer between the UE and network has stalled.

In some cases, circuitry 1326 for expediting may include circuitry for expediting one or more recovery actions if the inactivity expires due to one or more conditions.

In some cases, circuitry 1326 for expediting may include circuitry for declaring a radio link failure (RLF) and expediting a connection procedure if the uplink inactivity timer expires due to one or more particular causes.

In some cases, circuitry 1328 for selecting may include circuitry for selecting a value of the at least one inactivity timer based on one or more considerations.

In some cases, circuitry 1330 for adjusting may include circuitry for adjusting the value of the inactivity timer based on at least one of a data type or a volume of data.

In some cases, circuitry 1332 for indicating may include circuitry for indicating information to a client or application regarding at least one of: the inactivity timer or the one or more recovery actions.

In some cases, the operations illustrated in FIG. 11, as well as other operations described herein for detecting data inactivity and expediting recovery action, may be implemented by one or means-plus-function components. For example, in some cases, such operations may be implemented by means for maintaining, means for expediting, means for selecting, means for adjusting, and means for indicating.

In some cases, means for maintaining, means for expediting, means for selecting, means for adjusting, and means for indicating, include a processing system, which may include one or more processors, such as the receive processor 458, the transmit processor 464, the TX MIMO processor 466, and/or the controller/processor 480 of the UE 120*a* illustrated in FIG. 4 and/or the processing system 1302 of the communication device 1300 in FIG. 13.

Example Clauses

Implementation examples are described in the following numbered clauses:

Clause 1: A method for wireless communications by a user equipment (UE), comprising: maintaining at least one inactivity timer to detect when uplink or downlink data transfer between the UE and network has stalled and expediting one or more recovery actions if the inactivity expires due to one or more conditions.

Clause 2: The method of Clause 1, wherein the at least one inactivity timer comprises an uplink inactivity timer that is started upon arrival of uplink data into a modem layer or an application processor.

Clause 3: The method of Clause 2, wherein the uplink inactivity timer is stopped or restarted if the uplink data is transmitted.

Clause 4: The method of any of Clauses 1-3, wherein the at least one inactivity timer comprises a downlink inactivity timer that is started if downlink data is expected in at least one of the modem layer or an application processor.

Clause 5: The method of Clause 4, wherein the downlink inactivity timer is stopped or restarted if downlink data is received.

Clause 6: The method of any of Clauses 1-5, wherein the expediting one or more recovery actions comprises declaring a radio link failure (RLF) and expediting a connection procedure if the uplink inactivity timer expires due to one or more particular causes.

Clause 7: The method of Clause 6, wherein the one or more particular causes comprise at least one mismatch in configuration between the UE and network.

Clause 8: The method of claim 7, wherein the at least one mismatch in configuration comprises: a mismatch in connected discontinuous reception (C-DRX) state; a mismatch in bandwidth part (BWP) configuration; a mismatch in ciphering or integrity parameters; a mismatch in medium access control (MAC) control element (CE) procedures; or a mismatch in access class barring assumptions.

Clause 9: The method of any of Clauses 6-8, wherein the one or more particular causes comprise at least one of: an ongoing scheduling request (SR); an ongoing random access channel (RACH) procedure; lack of uplink data transmission or lack of downlink data acknowledgement; or a mismatch in configuration between the UE and network.

Clause 10: The method of any of Clauses 6-9, wherein the one or more particular causes comprise at least one of: downlink status is not received; or expected downlink traffic feedback is not received.

Clause 11: The method of Clause 10, wherein the expected downlink traffic feedback comprises at least one of: a transmission control protocol (TCP) acknowledgment, a TCP response, or an application response.

Clause 12: The method of any of Clauses 1-11, further comprising selecting a value of the at least one inactivity timer based on one or more considerations.

Clause 13: The method of Clause 12, wherein the one or more considerations relate to at least one of: modem capability, application processor capability, a type of the data, application requirements, a radio access technology (RAT), or channel conditions.

Clause 14: The method of claim 13, wherein the application requirements relate to at least one of latency, quality of service (QOS), or service level agreements.

Clause 15: The method of any of Clauses 12-13, further comprising adjusting the value of the inactivity timer based on at least one of a data type or a volume of data.

Clause 16: The method of any of Clauses 1-15, further comprising indicating information to a client or application regarding at least one of: the inactivity timer or the one or more recovery actions.

Clause 17: A processing system for wireless communication, comprising: a memory comprising computer-executable instructions; one or more processors configured to execute the computer-executable instructions and cause the processing system to perform a method in accordance with any one of Clauses 1-16.

Clause 18: An apparatus for wireless communication, comprising means for performing a method in accordance with any one of Clauses 1-16.

Clause 19: A non-transitory computer-readable medium for wireless communication comprising computer-executable instructions that, when executed by one or more processors of a processing system, cause the processing system to perform a method in accordance with any one of Clauses 1-16.

Clause 20: A computer program product for wireless communication embodied on a computer-readable storage medium comprising code for performing a method in accordance with any one of Clauses 1-16.

Additional Considerations

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    selecting a value of at least one inactivity timer for detecting when uplink or downlink data transfer between the UE and a network entity has stalled, wherein the value of the at least one inactivity timer is selected based on: a modem capability of the UE, an application processor capability, a type of data, application requirements, a radio access technology (RAT), or a combination thereof;
    maintaining the at least one inactivity timer to detect when the uplink or downlink data transfer has stalled due to one or more reasons not involving radio conditions; and
    expediting one or more recovery actions if the at least one inactivity timer expires due to the one or more reasons.

2. The method of claim 1, wherein the at least one inactivity timer comprises
    an uplink inactivity timer that is started upon arrival of uplink data into a modem layer or an application processor.

3. The method of claim 2, wherein the uplink inactivity timer is stopped or restarted if the uplink data is transmitted.

4. The method of claim 1, wherein the at least one inactivity timer comprises a downlink inactivity timer that is started if downlink data is expected in at least one of a modem layer or an application processor.

5. The method of claim 4, wherein the downlink inactivity timer is stopped or restarted if downlink data is received.

6. The method of claim 1, wherein the expediting one or more recovery actions comprises declaring a radio link failure (RLF) and expediting a connection procedure if the inactivity timer expires due to the one or more reasons.

7. The method of claim 6, wherein the one or more reasons comprise at least one mismatch in configuration between the UE and the network entity.

8. The method of claim 7, wherein the at least one mismatch in configuration comprises:
- a mismatch in connected discontinuous reception (C-DRX) state;
- a mismatch in bandwidth part (BWP) configuration;
- a mismatch in ciphering or integrity parameters;
- a mismatch in medium access control (MAC) control element (CE) procedures; or
- a mismatch in access class barring assumptions.

9. The method of claim 6, wherein the one or more reasons comprise at least one of:
- an ongoing scheduling request (SR);
- an ongoing random access channel (RACH) procedure;
- lack of uplink data transmission or lack of downlink data acknowledgement; or
- a mismatch in configuration between the UE and the network entity.

10. The method of claim 6, wherein the one or more reasons comprise at least one of:
- downlink status is not received; or
- expected downlink traffic feedback is not received.

11. The method of claim 10, wherein the expected downlink traffic feedback comprises at least one of: a transmission control protocol (TCP) acknowledgment, a TCP response, or an application response.

12. The method of claim 1, wherein the application requirements relate to at least one of latency, quality of service (QOS), or service level agreements.

13. The method of claim 1, further comprising adjusting the value of the at least one inactivity timer based on at least one of a data type or a volume of data.

14. The method of claim 1, further comprising indicating information to a client or application regarding at least one of:
- the at least one inactivity timer; or
- the one or more recovery actions.

15. A processing system for wireless communication, comprising:
- a memory comprising computer-executable instructions; and
- one or more processors configured to execute the computer-executable instructions and cause the processing system to:
  - select a value of at least one inactivity timer for detecting when uplink or downlink data transfer between a user equipment (UE) and a network entity has stalled, wherein the value of the at least one inactivity timer is selected based on: a modem capability of the UE, an application processor capability, a type of data, application requirements, a radio access technology (RAT), or a combination thereof;
  - maintain the at least one inactivity timer to detect when the uplink or downlink data transfer has stalled due to one or more reasons not involving radio conditions; and
  - expedite one or more recovery actions if the at least one inactivity timer expires due to the one or more reasons.

16. The processing system of claim 15, wherein the at least one inactivity timer comprises an uplink inactivity timer that is started upon arrival of uplink data into a modem layer or an application processor.

17. The processing system of claim 16, wherein the uplink inactivity timer is stopped or restarted if the uplink data is transmitted.

18. The processing system of claim 15, wherein the at least one inactivity timer comprises a downlink inactivity timer that is started if downlink data is expected in at least one of a modem layer or an application processor.

19. The processing system of claim 18, wherein the downlink inactivity timer is stopped or restarted if downlink data is received.

20. The processing system of claim 15, wherein, in order to expedite the one or more recovery actions, the one or more processors are configured to cause the processing system to declare a radio link failure (RLF) and expedite a connection procedure due to the one or more reasons.

21. The processing system of claim 20, wherein the one or more reasons comprise at least one mismatch in configuration between the UE and the network entity.

22. The processing system of claim 21, wherein the at least one mismatch in configuration comprises:
- a mismatch in connected discontinuous reception (C-DRX) state;
- a mismatch in bandwidth part (BWP) configuration;
- a mismatch in ciphering or integrity parameters;
- a mismatch in medium access control (MAC) control element (CE) procedures; or
- a mismatch in access class barring assumptions.

23. The processing system of claim 20, wherein the one or more reasons comprise at least one of:
- an ongoing scheduling request (SR);
- an ongoing random access channel (RACH) procedure;
- lack of uplink data transmission or lack of downlink data acknowledgement;
- a mismatch in configuration between the UE and the network entity;
- downlink status is not received; or
- expected downlink traffic feedback is not received, wherein the expected downlink traffic feedback comprises at least one of: a transmission control protocol (TCP) acknowledgment, a TCP response, or an application response.

24. The processing system of claim 15, wherein the application requirements relate to at least one of latency, quality of service (QOS), or service level agreements.

25. The processing system of claim 24, wherein the one or more processors are configured to cause the processing system to adjust the value of the at least one inactivity timer based on at least one of a data type or a volume of data.

26. The processing system of claim 15, wherein the one or more processors are configured to cause the processing system to indicate information to a client or application regarding at least one of:
- the at least one inactivity timer; or
- the one or more recovery actions.

27. An apparatus for wireless communication by a user equipment (UE), comprising:
- means for selecting a value of at least one inactivity timer for detecting when uplink or downlink data transfer between the UE and a network entity has stalled, wherein the value of the at least one inactivity timer is selected based on: a modem capability of the UE, an application processor capability, a type of data, application requirements, a radio access technology (RAT), or a combination thereof;

means for maintaining the at least one inactivity timer to detect when the uplink or downlink data transfer has stalled due to one or more reasons not involving radio conditions; and means for expediting one or more recovery actions if the at least one inactivity timer expires due to the one or more reasons.

28. A non-transitory computer-readable medium for wireless communication by a user equipment (UE), comprising:

computer-executable instructions that, when executed by one or more processors of a processing system, cause the processing system to:

select a value of at least one inactivity timer for detecting when uplink or downlink data transfer between the UE and a network entity has stalled, wherein the value of the at least one inactivity timer is selected based on: a modem capability of the UE, an application processor capability, a type of data, application requirements, a radio access technology (RAT), or a combination thereof;

maintain the at least one inactivity timer to detect when the uplink or downlink data transfer has stalled due to one or more reasons not involving radio conditions; and expedite one or more recovery actions if the at least one inactivity timer expires due to the one or more reasons.

* * * * *